US012423862B2

(12) United States Patent
Sato

(10) Patent No.: US 12,423,862 B2
(45) Date of Patent: Sep. 23, 2025

(54) IMAGE PROCESSING APPARATUS, IMAGE PROCESSING METHOD, AND STORAGE MEDIUM FOR RECONSTRUCTING THREE-DIMENSIONAL COORDINATES OF A FEATURE POINT OF AN OBJECT

(71) Applicant: CANON KABUSHIKI KAISHA, Tokyo (JP)

(72) Inventor: Tomokazu Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 18/154,062

(22) Filed: Jan. 13, 2023

(65) Prior Publication Data

US 2023/0245343 A1   Aug. 3, 2023

(30) Foreign Application Priority Data

Jan. 28, 2022 (JP) ................................. 2022-011602

(51) Int. Cl.
*G06T 7/73* (2017.01)
*G06T 19/00* (2011.01)
(Continued)

(52) U.S. Cl.
CPC ................ *G06T 7/73* (2017.01); *G06T 19/00* (2013.01); *G06V 20/70* (2022.01); *G06T 2207/30201* (2013.01); *G06V 40/168* (2022.01)

(58) Field of Classification Search
None
See application file for complete search history.

(56) References Cited

U.S. PATENT DOCUMENTS 11,481,910 B2   10/2022  Shiraishi et al.
2014/0363048 A1*  12/2014  Vrcelj .................. G06F 18/211
                                                                    382/103
(Continued)

FOREIGN PATENT DOCUMENTS

CN   113313097 B   11/2021
JP   2005-317000 A  11/2005
(Continued)

OTHER PUBLICATIONS

Extended European Search Report issued by the European Patent Office in EP Patent Application No. 23152393.7, dated Oct. 2, 2023, pp. 1-17.

(Continued)

*Primary Examiner* — Steven Z Elbinger
(74) *Attorney, Agent, or Firm* — Carter, DeLuca & Farrell LLP

(57) ABSTRACT

Resulting from a reduction in the accuracy of a feature point obtained from a viewpoint inclined with respect to the front direction of an object, the estimation accuracy of three-dimensional coordinates of the feature point is reduced. Consequently, from each of a plurality of images captured from a plurality of viewpoints, the feature point of the object is detected and attribute information indicating which area of the object the detected feature point belongs to is appended to the detected feature point. Then, for each of the same attribute information, the three-dimensional coordinates of the feature point are calculated by using two-dimensional coordinates of the feature point on the image corresponding to the viewpoints not more than the plurality of viewpoints and not less than two.

13 Claims, 14 Drawing Sheets

(51) Int. Cl.
  *G06V 20/70* (2022.01)
  *G06V 40/16* (2022.01)

(56) References Cited

U.S. PATENT DOCUMENTS

| | | | | |
|---|---|---|---|---|
| 2017/0018088 | A1* | 1/2017 | Jeong | G06T 7/74 |
| 2019/0098215 | A1* | 3/2019 | Narita | G06T 7/50 |
| 2019/0318151 | A1* | 10/2019 | Shichijo | G06V 10/761 |
| 2021/0082143 | A1* | 3/2021 | Lee | G05D 1/02 |
| 2022/0011579 | A1* | 1/2022 | Wang | G06T 7/70 |
| 2022/0254059 | A1* | 8/2022 | Zhou | G06T 7/11 |
| 2023/0018179 | A1 | 1/2023 | Shiraishi et al. | |
| 2023/0334693 | A1* | 10/2023 | Miyajima | G06T 7/73 |

FOREIGN PATENT DOCUMENTS

| | | |
|---|---|---|
| JP | 2007-102601 A | 4/2007 |
| JP | 2009-157767 A | 7/2009 |
| JP | 4539519 B2 | 9/2010 |
| JP | 2019-128641 A | 8/2019 |
| JP | 6908312 B1 | 7/2021 |
| WO | 2018/123801 A1 | 7/2018 |
| WO | 2019/230813 A1 | 12/2019 |

OTHER PUBLICATIONS

Notice of Reasons for Refusal issued by the Japanese Patent Office on Dec. 24, 2024 in corresponding JP Patent Application No. 2022-011602, with English translation.

Dou, P. et al., "Multi-view 3D face reconstruction with deep recurrent neural networks", 2017 IEEE International Joint Conference on Biometrics (IJCB) (Oct. 2017), pp. 483-492.

Partial European Search Report issued by the European Patent Office in EP Patent Application No. 23152393.7, dated Jul. 4, 2023, pp. 1-36.

Notice of Reasons for Refusal issued by the Japanese Patent Office on Jun. 3, 2025 in corresponding JP Patent Application No. 2022-011602, with English translation.

* cited by examiner

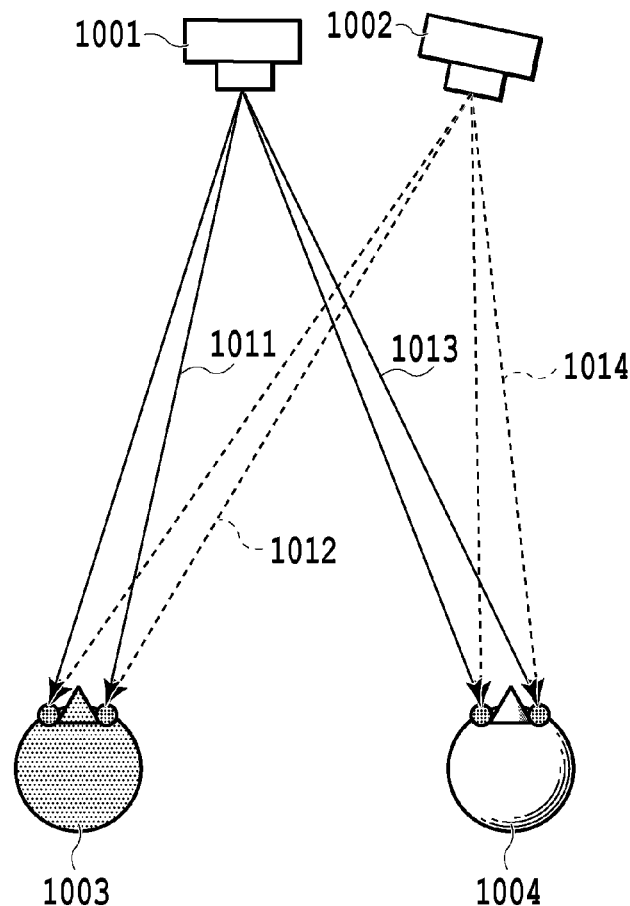
FIG.10A
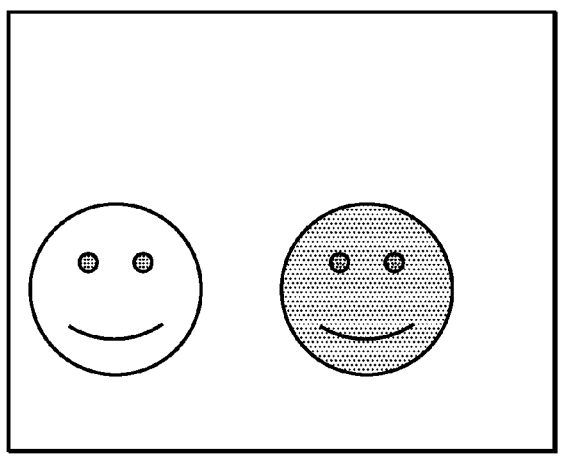 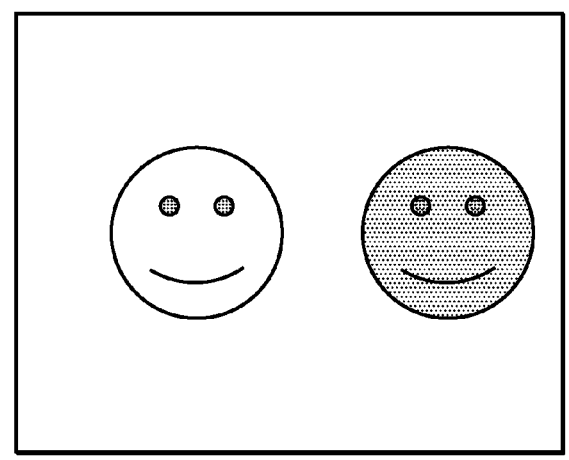
FIG.10B        FIG.10C

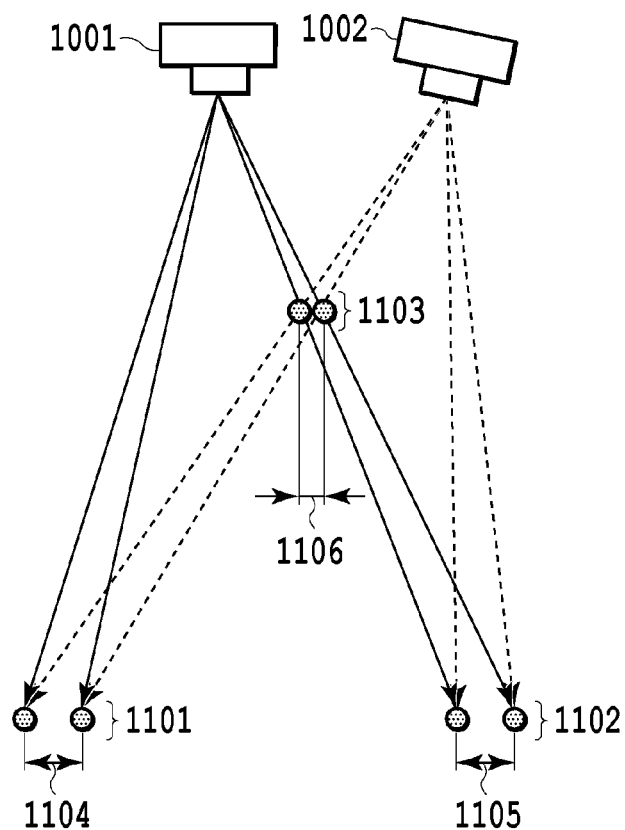
FIG.11A
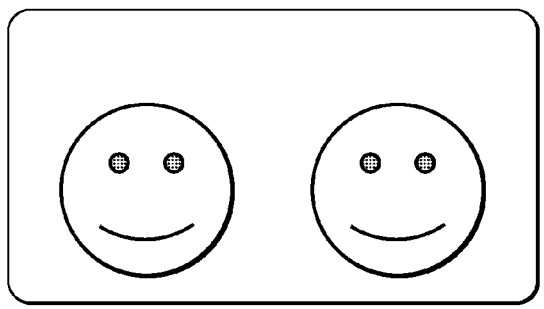 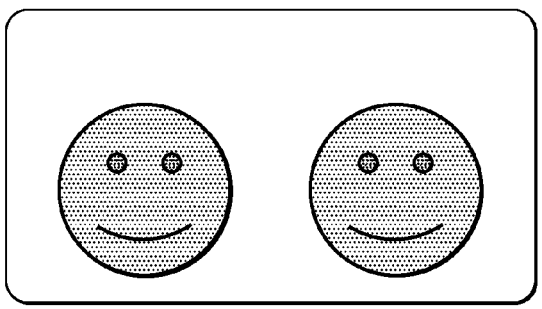
FIG.11B  FIG.11C

IMAGE PROCESSING APPARATUS, IMAGE PROCESSING METHOD, AND STORAGE MEDIUM FOR RECONSTRUCTING THREE-DIMENSIONAL COORDINATES OF A FEATURE POINT OF AN OBJECT

BACKGROUND

Field

The present disclosure relates to a technique to reconstruct three-dimensional coordinates of a feature point of an object.

Description of the Related Art

A technique to generate a 3D model (three-dimensional shape data) of an object based on a plurality of captured images obtained by capturing the object from different viewpoints is utilized widely in the field, such as computer graphics. Japanese Patent Laid-Open No. 2005-317000 has disclosed a method of selecting an optimum viewpoint in a case where the three-dimensional shape of the head of a person is reconstructed by using image data obtained by capturing the head with imaging apparatuses arranged so as to surround the head three-dimensionally.

At the time of generating a 3D model of an object from a plurality of captured images corresponding to a plurality of viewpoints, it is required to obtain three-dimensional coordinates (world coordinates) of the feature point of the object with a high accuracy. Japanese Patent Laid-Open No. 2007-102601 has disclosed a method of correcting the feature point of a standard face model so as to fit to the shape of the face of an image capturing-target person by using the image coordinates of the feature point, such as the corner of eye and the corner of mouth, on each image obtained by performing image capturing from multiple viewpoints by taking the face of the person as a target. Here, the image coordinates are two-dimensional coordinate information indicating one point on the image. In order to obtain the world coordinates of the feature point of the object that can take a free orientation with a high accuracy, it is important to make it possible to obtain the image coordinates of the feature point with a high accuracy by selecting an appropriate viewpoint from among a plurality of viewpoints corresponding to each captured image. For example, in a case of detecting a feature point from the captured image of the face of a person, in the captured image obtained by capturing the face from the oblique right, it is possible to detect the feature point of the right half of the face with a high accuracy, but in many cases, the detection accuracy of the feature point of the left half (on the opposite side) is reduced. This results from the fact that the face of a person has an inclined three-dimensional structure bilaterally symmetric about the nose. Here, in the captured image obtained by capturing the face of a person from the front, it is possible to detect all feature points with a high accuracy. However, in order to obtain the world coordinates from the image coordinates with a high accuracy, a predetermined amount of disparity is necessary and it is not possible to obtain three-dimensional coordinates of the face feature point only from the captured image obtained by capturing the face of a person from the front.

As above, utilizing the captured image obtained by capturing the object in the oblique direction in reconstruction of the world coordinates of the feature point has a merit. On the other hand, there is a demerit in that the accuracy of the image coordinates of the feature point on the far side from the image capturing viewpoint, and as a result of that, there is such a problem that a reduction in the accuracy of the three-dimensional coordinates that are obtained is caused.

SUMMARY

The image processing apparatus according to the present disclosure includes: one or more memories storing instructions; and one or more processors executing the instructions to: detect a feature point of an object from a plurality of images obtained by being captured from a plurality of viewpoints; append attribute information to the detected feature point, which indicates an area of the object to which the feature point belongs; and determine three-dimensional coordinates of a feature point to which the same attribute information is appended based on two-dimensional coordinates of the feature point in images corresponding to viewpoints not more than the plurality of viewpoints and not less than two.

Further features of the present disclosure will become apparent from the following description of exemplary embodiments with reference to the attached drawings.

BRIEF DESCRIPTION OF THE DRAWINGS

FIG. 10A is a diagram showing the way two faces are captured from two viewpoints and FIG. 10B and FIG. 10C are each a diagram showing a captured image corresponding to two viewpoints;

FIG. 11A is a diagram explaining a calculation error of world coordinates of a feature point and FIG. 11B and FIG. 11C are each a diagram explaining results of identification of a person;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Hardware Configuration>

Figure 1:
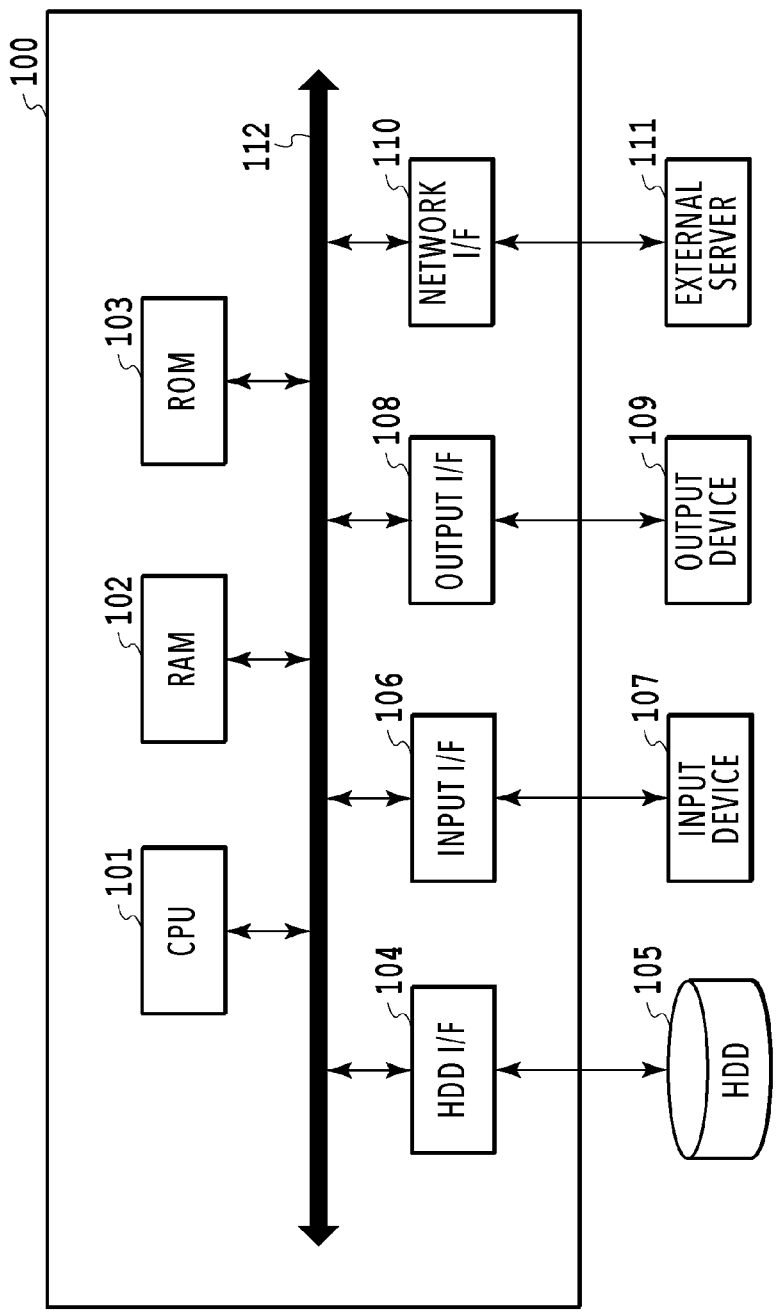
FIG. 1 is a diagram showing a hardware configuration example of an image processing apparatus.

FIG. 1 a diagram showing a hardware configuration example of an image processing apparatus 100 in the present embodiment. In FIG. 1, a CPU 101 executes programs stored in a ROM 103 and a hard disk drive (HDD) 105 by using a RAM 102 as a work memory and controls the operation of each block, to be described later, via a system bus 112. An HDD interface (in the following, interface is described as "I/F") 104 connects a secondary storage device, such as the HDD 105 and an optical disk drive. The HDD I/F 104 is an I/F, for example, such as serial ATA (SATA). It is possible for the CPU 101 to read data from the HDD 105 and write data to the HDD 105 via the HDD I/F 104. Further, it is also possible for the CPU 101 to load data stored in the HDD 105 onto the RAM 102, and conversely, to store data loaded onto the RAM 102 in the HDD 105. Then, it is possible for the CPU 101 to execute the data loaded onto the RAM 102 as a program. An input I/F 106 connects an input device 107, such as a keyboard, a mouse, a digital camera, and a scanner. The input I/F 106 is a serial bus I/F, for example, such as USB and IEEE 1394. It is possible for the CPU 101 to read various kinds of data, such as a captured image, from the input device 107 via the input I/F 106. An output I/F 108 connects the image processing apparatus 100 and a display, which is an output device 109. The output I/F 108 is a video output I/F, for example, such as DVI and HDMI (registered trademark). It is possible for the CPU 101 to send data to the display via the output I/F 108 and cause the display to display a predetermined video. A network I/F 110 connects the image processing apparatus 100 and an external server 111.

<Software Configuration>

Figure 2:
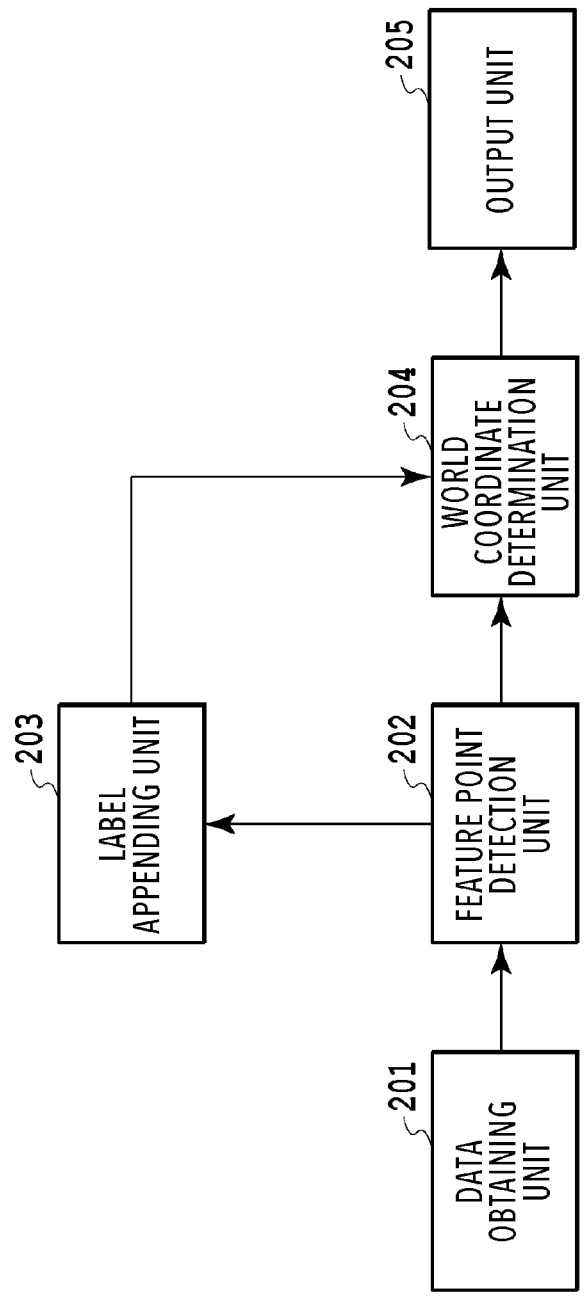
FIG. 2 is a block diagram showing a software configuration of an image processing apparatus according to a first embodiment.

FIG. 2 is a block diagram showing the software configuration of the image processing apparatus 100 according to the present embodiment. In the following, with reference to the flowchart shown in FIG. 3, each function of the image processing apparatus 100 of the present embodiment is explained. In the following explanation, symbol "S" means a step.

Figure 4:
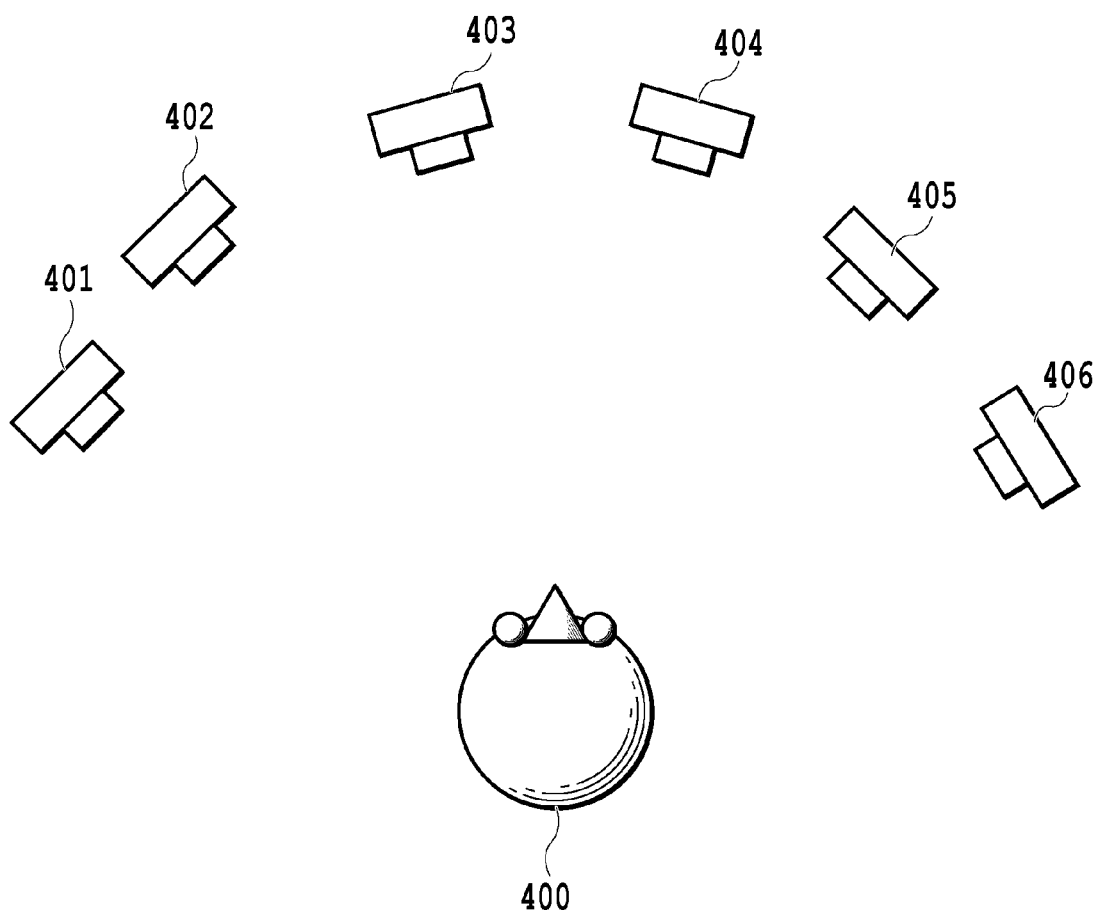
FIG. 4 is a schematic diagram showing the way the face of a person is captured from different viewpoints.

At S301, a data obtaining unit 201 reads and obtains data of a plurality of images (in the following, called "multi-viewpoint images") captured from different viewpoints and camera parameters thereof from the HDD 105 or the like. FIG. 4 is a schematic diagram showing the way a head 400 of a person as an image capturing-target object is captured from six different viewpoints 401 to 406 from which the face can be seen. Here, explanation is given on the assumption that multi-viewpoint images obtained by performing image capturing from the six different directions as shown schematically and camera parameters at that time are obtained. The camera parameters include the position of the viewpoint, the orientation, the focal length, and the main point and are information capable of converting two-dimensional coordinates on the image into rays passing the position of the viewpoint.

Figure 5A:
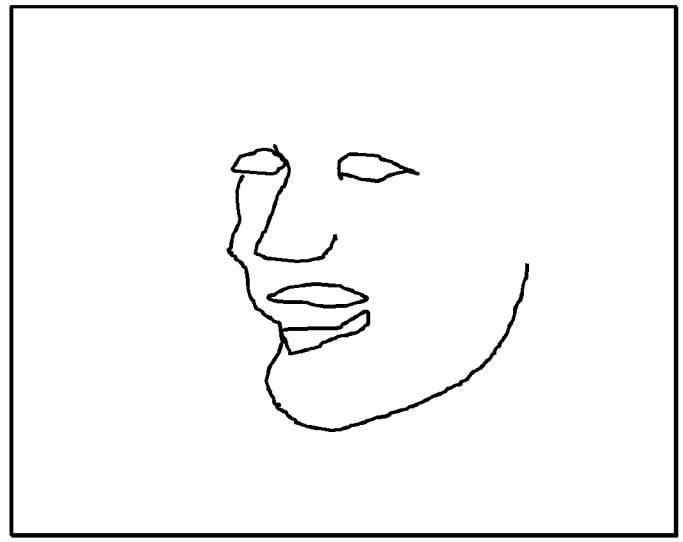
FIG. 5A is a diagram showing an example of a captured image of the left face and FIG. 5B is a diagram showing examples of feature points of the face.
Figure 5B:
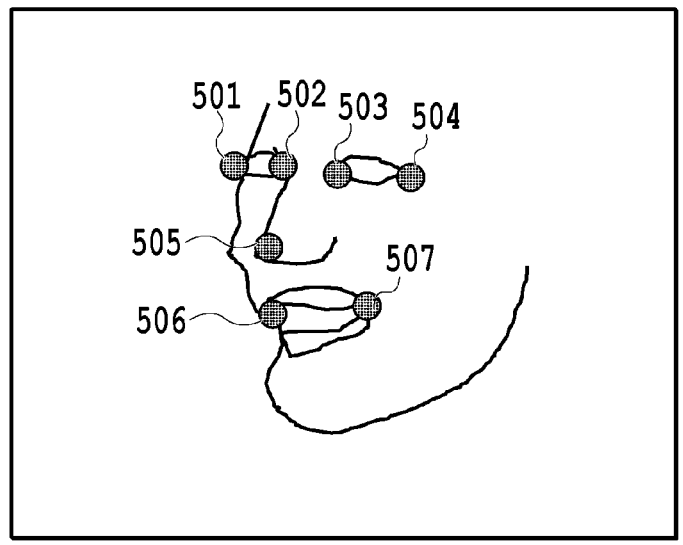

At S302, a feature point detection unit 202 detects a feature point of an object from each captured image configuring the obtained multi-viewpoint images. For the detection of a face feature point from a captured image in which the face of a person is captured, for example, it may be possible to use a publicly known face recognition technique, such as Dlib and OpenCV. Here, it is assumed that seven points of the corner of left eye, the corner of right eye, the left inner canthus, the right inner canthus, the left corner of mouth, the right corner of mouth, and the nose top are detected as the face feature points. The above-described seven points as the face feature points are merely exemplary and one or more of the above-described seven points may not be included or other points, such as the point between the eyebrows, the point on the cheek, and the point on the line of the jaw, may be included. FIG. 5A shows the captured image obtained by capturing the head 400 from the viewpoint 402 in FIG. 4. Then, FIG. 5B shows the positions (image coordinates) on the image of the above-described seven face feature points detected from the captured image in FIG. 5A, that is, a corner of right eye 501, a right inner canthus 502, a corner of left eye 503, a left inner canthus 504, a nose top 505, a right corner of mouth 506, and a left corner of mouth 507. In the captured image such as this obtained by capturing the left side of the face, the detection accuracy of the feature points on the right side of the face, that is, the detection accuracy of the corner of right eye 501, the right inner canthus 502, and the right corner of mouth 506 is reduced relatively. Further, in the present embodiment, the feature point detection unit 202 also estimates the orientation of the object. For example, Dlib described above has the function to estimate the orientation of a face, in addition to the function to detect the feature point of the face and by utilizing the function, it is possible to obtain orientation information on the face as well. Here, the orientation of the object is relative to the image capturing viewpoint and represented by roll, pitch, and yaw.

Figure 6A:
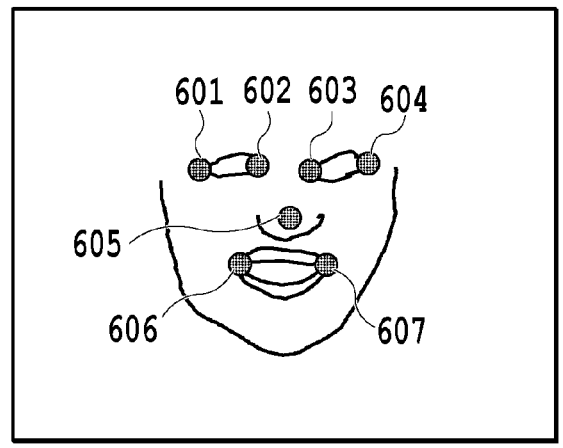
FIG. 6A is a diagram showing feature points of the front face and FIG. 6B and FIG. 6C are each a diagram showing examples of attribute labels appended to the feature points.
Figure 6B:
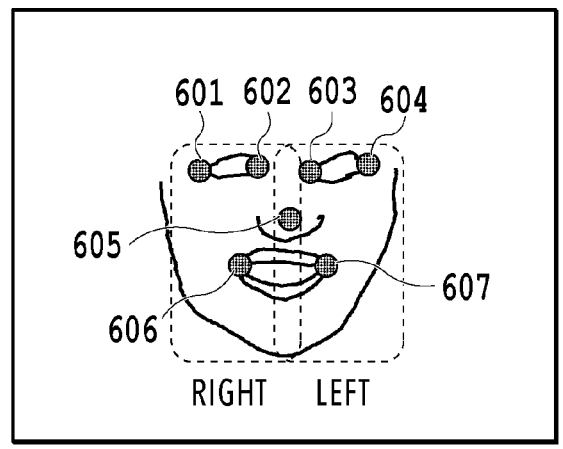
Figure 6C:
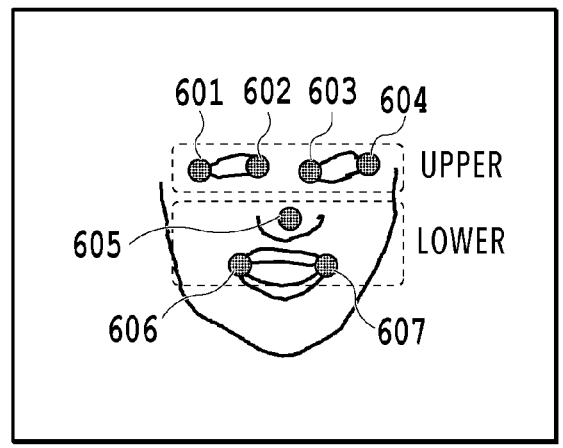

At S303, a label appending unit 203 appends a label (in the following, called "attribute label") as attribute information indicating to which area of the object the feature point belongs to each of the feature points detected at S302. FIG. 6A shows the above-described seven face feature points (corner of right eye 601, right inner canthus 602, corner of left eye 603, left inner canthus 604, nose top 605, right corner of mouth 606, and left corner of mouth 607) detected from the captured image corresponding to the viewpoint 404. Then, FIG. 6B shows the attribute labels appended to the face feature points 601 to 607 in FIG. 6A. As shown in FIG. 6B, to the feature points (corner of right eye 601, right inner canthus 602, nose top 605, right corner of mouth 606) belonging to the right side of the face including the center, a right label is appended. Further, to the feature points (corner of left eye 603, left inner canthus 604, nose top 605, and left corner of mouth 607) belonging to the left side of the face including the center, a left label is appended. Here, it is necessary to pay attention to that appending the attribute label is performed for each feature point. That is, for example, in a case where the right label is appended to "corner of right eye", the right label is appended to "corner of right eye" in all the captured images configuring the multi-viewpoint images. Here, the attribute label that classifies the face into one of the left and right areas is appended, but the kinds of attribute label are not limited to those and for example, it may also be possible to append an attribute label that represents which of the upper side and the lower side a feature point belongs to as shown in FIG. 6C. Further, it may also be possible to classify labels into four kinds of label, such as an upper-right label, a lower-right label, an upper-left label, and a lower-left label by combining the left and right labels and the upper and lower labels. It may be possible to appropriately determine the classification of attribute labels in accordance with the shape characteristics of a target object. In the present embodiment, it is supposed to automatically append the attribute label based on the results of feature point detection, but it may also be possible for an operator to manually append the attribute label.

At S304, a world coordinate determination unit 204 calculates the world coordinates of the feature point detected at S302 for each attribute label appended at S303. In this calculation, first, from each viewpoint of the multi-viewpoint images, a viewpoint (candidate viewpoint) that is the candidate of the viewpoint that is used for the calculation of the world coordinates of the feature point is extracted for each attribute label based on the object orientation information identified at S302. After that, the world coordinate determination unit 204 calculates the world coordinates (three-dimensional coordinates) of the feature point by using the image coordinates (two-dimensional coordinates) of the feature point on the captured image corresponding to the extracted candidate viewpoint. Here, a specific flow of the processing to calculate the world coordinates of the feature point for each attribute label in a case where the object is the face of a person and the two kinds of attribute label, that is, the left and right attribute labels are appended is explained in detail with reference to the drawings.

《Extraction of Candidate Viewpoint》

Figure 7:
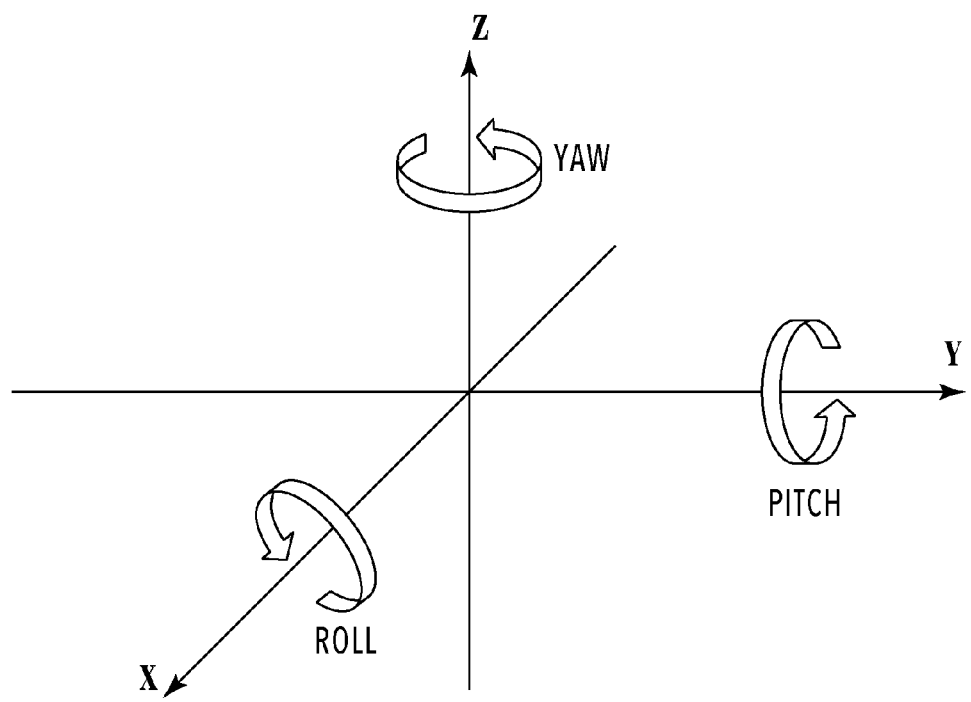
FIG. 7 is a diagram explaining roll, pitch, and yaw in a right-hand system.
Figure 8:
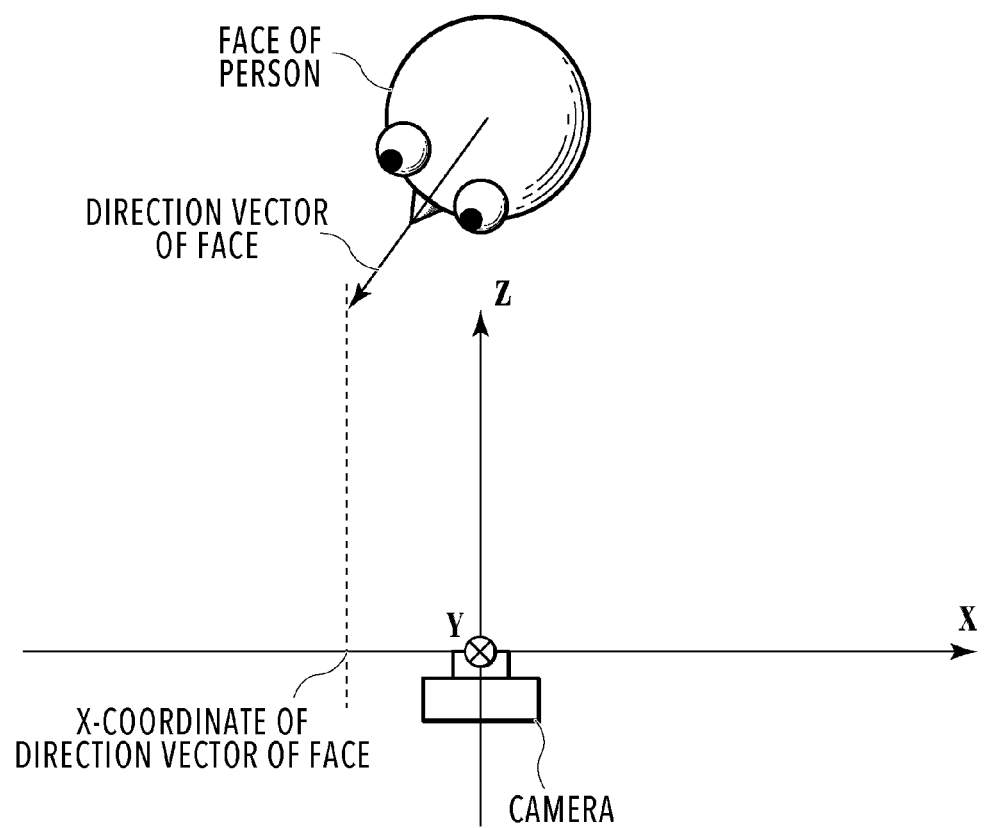
FIG. 8 shows a definition of a camera coordinate system.
Figure 9:
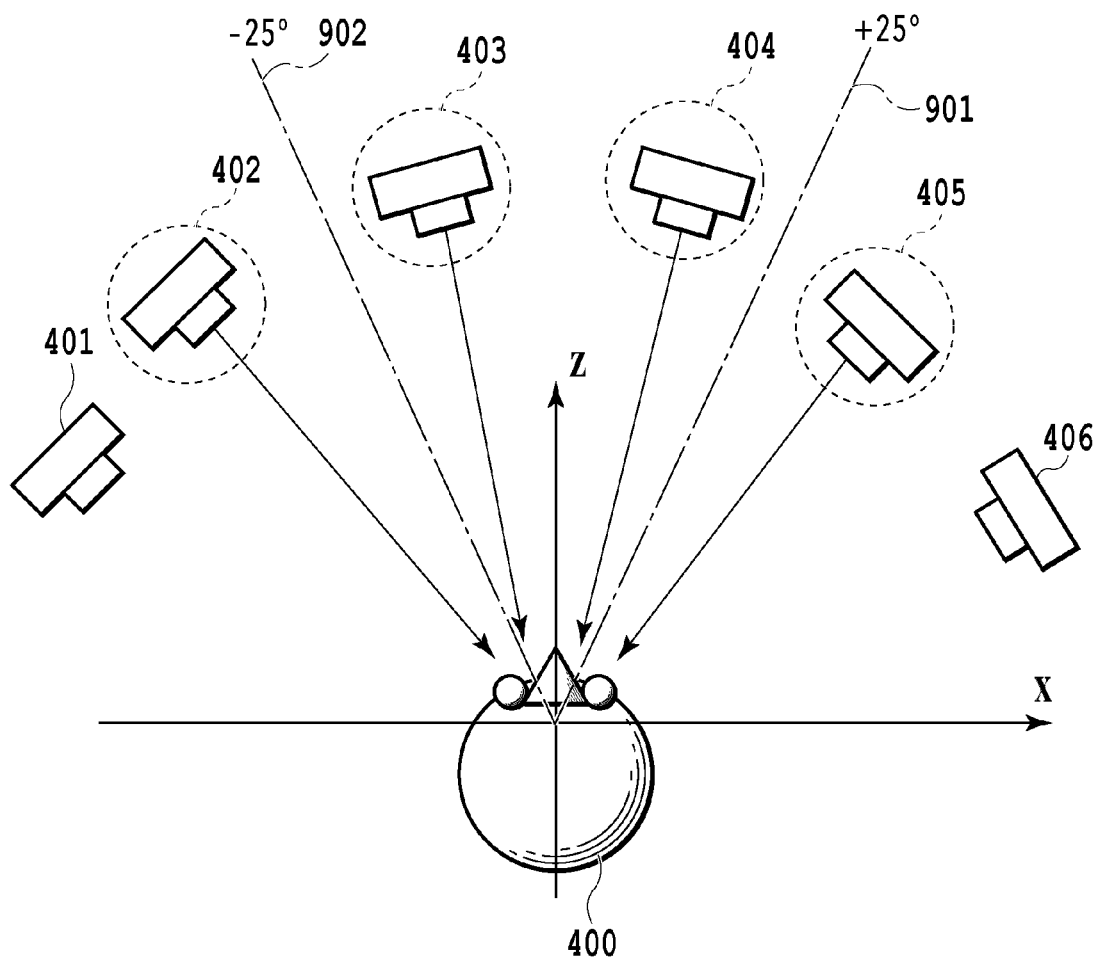
FIG. 9 is a diagram explaining extraction of a candidate viewpoint.

As described above, the face orientation information is represented by roll, pitch, and yaw. FIG. 7 is a diagram showing an image of rotation of roll, pitch, and yaw in the right-hand system and in the present embodiment, the right-hand system is employed, but the left-hand system may be employed. Yaw represents rotation to left and right with respect to a viewpoint and in a case where yaw is zero degrees, the face faces the front. Roll represents rotation with respect to a viewpoint and in a case where roll is zero degrees, the face is erect (in a case where roll is 180 degrees, the face is inverted). Then, pitch represents angles of elevation and depression with respect to a viewpoint and in a case where pitch is zero degrees, the face faces the front and as pitch increases, the face faces downward. For example, in a case where roll and pitch are zero degrees, on a condition that yaw is positive, it is possible to determine that the right side of the face is captured and on a condition that yaw is negative, it is possible to determine that the left side of the face is captured. Consequently, roll, pitch, and yaw are converted into a direction vector (unit vector) in the three-dimensional camera coordinate system and in a case where the x-component of the viewpoint is less than or equal to a threshold value R, the viewpoint is taken to be the candidate viewpoint in the left label and in a case where the x-component is larger than or equal to a threshold value L, the viewpoint is taken to be the candidate viewpoint in the right label. FIG. 8 shows the definition of the camera coordinate system. Here, the camera coordinate system is a coordinate system in which the position of the imaging apparatus (camera) is taken to be the origin, the light axis direction of the camera is defined as z, the rightward direction is defined as x, and the downward direction is defined as z. In a case where the face faces in the viewpoint direction, the value of the z-axis of the direction vector is negative. The left or right orientation of the face is represented by the value of the x-axis and this coincides with the sine for the angle to left and right of the face. Consequently, for example, in a case where the attribute label is appended by taking the range from the front to 25 degrees in the opposite directions as a target, it is sufficient to set the threshold value R to sin(25°) and the threshold value L to −sin(25°). FIG. 9 shows the range between +25 degrees and −25 degrees with respect to the front direction of the head 400 in the specific example in FIG. 4. In this example, the four viewpoints 401 to 404 located on the left side of a segment 901 indicating +25° are extracted as the candidate viewpoints of the left label and the four viewpoints 403 to 406 located on the right side of a segment 902 indicating −25° are extracted as the candidate viewpoints of the right label. In this manner, the candidate viewpoints not more than the plurality of viewpoints and not less than two corresponding to the input multi-viewpoint images are extracted as the candidate viewpoints.

《Calculation of World Coordinates》

Next, a set of two viewpoints is selected from among the candidate viewpoints extracted for each attribute label and by using the image coordinates of the feature point on the captured image corresponding to the two viewpoints, the world coordinates of the feature point to which the same attribute label is appended are calculated. In a case where the calculation of all the sets of two viewpoints is completed, the world coordinates of the set whose error is the smallest are taken to be the world coordinates in the same attribute label. Here, the error is handled as the distance between two rays in the three-dimensional space, which are in a torsional relationship. An error calculation method is explained in detail along a specific example in FIG. 9. First, the image coordinates of the feature point detected at the viewpoints 401 to 406 are defined as $q_{ij}$. Here, i represents the viewpoint number and j represents the number of the feature point. Next, orientation information in the world coordinates of each viewpoint is taken to be $R_i$ and position information is taken to be $d_i$. $R_i$ and $d_i$ are generally called external parameters of a camera. Next, the focal length of each camera and the main point are represented by 3×3 matrix internal parameters $A_i$. By using these parameters, a ray $r_{ij}$ corresponding to the feature point j at the viewpoint i is found by formula (1) below.

$$r_{ij}=t(A_iR_i)^{-1}q'_{ij}+d_i \qquad \text{formula (1)}$$

In formula (1) described above, t is a coefficient. Further, $q'_{ij}$ is homogeneous coordinates (three-dimensional) of $q_{ij}$ and generated by adding 1 to the last element of the two-dimensional image coordinates. It is rare that two rays consisting of feature points obtained independently intersect and in many cases, they are in a torsional relationship. Consequently, at the time of finding the intersection, the middle point of the segment in a case where the segment consisting of two points on the two rays becomes the shortest is obtained approximately. Here, two rays $r_1$ ($t_1$) and $r_2$ ($t_2$) of ray $r_{ij}$ are replaced with those as in formula (2) and formula (3) below, respectively.

$$r_1(t_1)=p_1+t_1d_1 \qquad \text{formula (2)}$$

$$r_2(t_2)=p_2+t_2d_2 \qquad \text{formula (3)}$$

At this time, each of coefficients $t_1$ and $t_2$ corresponding to the point on each ray of the above-described shortest segment are expressed by formula (4) and formula (5) below, respectively.

$$t_1=((p_2-p_1)\times d_2)\cdot(d_1\times d_2)/\|d_1\times d_2\|^2 \quad \text{formula (4)}$$

$$t_2=((p_2-p_1)\times d_1)\cdot(d_1\times d_1)/\|d_1\times d_2\|^2 \quad \text{formula (5)}$$

Consequently, an intersection h that is obtained is the middle point of two points obtained from these coefficients $t_1$ and $t_2$ and expressed by formula (6) below.

$$h=(r_i(t_i)+r_2(t_2))/2 \quad \text{formula (6)}$$

Further, an error e thereof is half the length of the segment and can be found by formula (7) below.

$$e=\|r_1(t_1)-r_2(t_2)\|/2 \quad \text{formula (7)}$$

In this manner, the above-described error e is found by taking the set of two viewpoints elected from among the candidate viewpoints as a target and the world coordinates obtained from the set whose error e is the smallest are taken to be the world coordinates of the feature point in that attribute label. For example, on the captured image corresponding to the viewpoint 401 from which the left side of the face is captured, the deviation of the feature point on the right side of the face is normally large, and therefore, the error e is large in the combination of the viewpoints 401 and any of the viewpoints 402 to 404. Because of this, the world coordinates obtained from the set of the two viewpoints including the viewpoint 401 are not employed as the world coordinates of the left label. This is the same with the viewpoint 406 from which the right side of the face is captured. That is, similarly, the error e is large in the combination of the viewpoint 406 and any of the viewpoints 403 to 405, and therefore, the world coordinates obtained from the set of the two viewpoints including the viewpoint 406 are not employed as the world coordinates of the right label.

To summarize the above, from the viewpoint 401 and the viewpoint 406, image capturing is performed at positions whose inclination with respect to the front direction of the face is large, and therefore, the deviation of the detection position of the feature point is large, and as a result, the above-described error e is large. Further, from the viewpoints 402 to 405, the face is captured in the front direction, and therefore, it is possible to detect the feature point with an accuracy higher than that from the viewpoint 401 and the viewpoint 406. However, on the other hand, there is a tendency for the detection accuracy of the feature point on the side opposite to the image capturing direction (the right half of the face in a case where the face is viewed from the viewpoints 402 and 403, the left half of the face in a case where the face is viewed from the viewpoints 404 and 405) to decrease, and therefore, the error becomes large accordingly. Eventually, for the left label, the world coordinates calculated from the set of the viewpoint 402 and the viewpoint 403 are employed and for the right label, the world coordinates calculated from the set of the viewpoint 404 and the viewpoint 405 are employed.

At S305, the world coordinate determination unit 204 determines the world coordinates of the feature points in the entire object based on the world coordinates of the feature point calculated for each attribute label. In the example in FIG. 6B described previously, to each feature point (corner of right eye 601, right inner canthus 602, nose top 605, right corner of mouth 606) on the right side of the face, the right label is appended and for each of the feature points, the world coordinates estimated from the selected viewpoints 404 and 405 are obtained. Further, to each feature point (corner of left eye 603, left inner canthus 604, nose top 605, left corner of mouth 607) on the left side of the face, the left label is appended and for each of the feature points, the world coordinates estimated from the selected viewpoints 402 and 403 are obtained. In this case, to the feature points other than the nose top 605, only one attribute label is appended, and therefore, the world coordinates calculated with respect to each attribute label are employed as they are. Then, for the nose top 605, the world coordinates are obtained for each of the right label and the left label, and therefore, the middle point of these is employed as the world coordinates of the nose top 605. In a case where there are three or more attribute labels, it is sufficient to find the average of them and take the average as the world coordinates of the target feature point. Alternatively, it may also be possible to employ the median or the mode of the world coordinates obtained for each attribute label or employ the world coordinates whose reprojection error is the smallest among the world coordinates obtained for each attribute label.

At S306, an output unit 205 outputs the world coordinates derived by the world coordinate determination unit 204. By using information on the output world coordinates, it is possible to correct the three-dimensional model. For example, it may also be possible to utilize information on the world coordinates to identify a concave portion for the three-dimensional model generated in advance and remove the data corresponding thereto. Alternatively, it may also be possible to change the position of the element constituting the three-dimensional model in place of removal of data. It may also be possible to utilize information on the world coordinates so as to reproduce concavities and convexities of the three-dimensional model with a high accuracy in this manner. The three-dimensional model generated in advance may be one generated based on the captured image obtained by capturing the object, one generated by using the computer graphics (CG) technique, or one created by combining them. Further, it may also be possible to utilize information on the world coordinates to estimate, for example, the orientation of the object (face or head). Furthermore, the object may be an object other than a face.

The above is the flow of the processing to obtain the world coordinates of the feature point of the object from the multi-viewpoint images in the image processing apparatus 100 according to the present embodiment. In the present embodiment, for the set of two viewpoints selected from among the candidate viewpoints, the error of the feature point having the same attribute label is calculated and the two viewpoints whose maximum value is the smallest are selected. Due to this, even in a case where the error is underestimated by chance with respect to the feature point whose deviation is large in the captured image corresponding to a certain viewpoint, the error becomes large with respect to another feature point, and therefore, it becomes hard for the certain viewpoint to be selected. Then, finally, it is made possible to select the most appropriate viewpoint.

Modification Example 1

With the method of the embodiment described above, in a case where a distance b between viewpoints is small (rays are substantially parallel), there is a tendency for the error e to become large in the depth direction with respect to the viewpoint. In view of this, it may also be possible to estimate an error e' expressed by formula (8) below as the error that becomes larger for the smaller distance between viewpoints by taking the straight line connecting the viewpoints and the estimated point as c.

$$e' = e\sqrt{1+(d/c)^2} \quad \text{formula (8)}$$

Modification Example 2

In the above-described embodiment, the set of two viewpoints is selected sequentially from among the candidate viewpoints of each attribute label and among the world coordinates of the feature points found from each set, the world coordinates obtained from the set of two viewpoints whose error is the smallest are employed as the world coordinates in that attribute label. Other than the method such as this, for example, it may also be possible to calculate the world coordinates of the feature point by using all the candidate viewpoints and employ the median or the average of the calculated world coordinates as the world coordinates in that attribute label. Alternatively, it may also be possible to calculate the world coordinates of the feature point by selecting the viewpoint that minimizes the sum total of the distances to the rays of all the candidate viewpoints. Further, it may also be possible to find the world coordinates of the feature point in the attribute label by combining those described above and excluding the viewpoint whose reprojection error is large (whose calculation error is estimated to be large). Furthermore, it may also be possible to select the viewpoint from among the candidate viewpoints so that the angle density of the viewpoint for the object is constant.

According to the present embodiment, it is made possible to obtain, with a high accuracy, the world coordinates of a feature point of an object capable of taking a free orientation in an image capturing environment.

Second Embodiment

In the first embodiment, the specific example is explained in which the world coordinates of the face feature point are obtained with a high accuracy by taking the head of a person as a target. As shown in FIG. 10A, in a case where a plurality of heads 1003 and 1004 is captured at the same time from different viewpoints 1001 and 1002, a captured image in FIG. 10B, which corresponds to the viewpoint 1001, and a captured image in FIG. 10C, which corresponds to the viewpoint 1002, are obtained. In each of both captured images, the faces of a plurality of persons are captured and from each captured image, the face feature point about each person is detected. However, unless somewhat processing is performed, it is unknown which person the face feature point detected from each captured image corresponds to between the different viewpoints (between different captured images). FIG. 11A is an example in a case where the world coordinates are calculated by using the image coordinates of the face feature point belonging to the different person, and therefore, the face feature point appears at the position at which the face of the person does not exist actually. In FIG. 11A, other than left and right eyes 1101 on the head 1003 that exists actually and left and right eyes 1102 on the head 1004 that exists actually, left and right eyes 1103 appear at the position at which the head of the person does not exist. In order to prevent the error such as this, it becomes necessary to associate the feature point and the object with each other in order to grasp which object each of the feature points detected from each captured image belongs to. In a case where the object is the head (face) of a person, by utilizing the face recognition technique, it is possible to identify the same person captured in different captured images and it is possible to solve this problem. However, other problems may arise, such as that it is necessary to obtain the feature of the face of each person in advance and that the processing requires time.

Consequently, an aspect is explained as the second embodiment in which an object is identified between different viewpoints (between different captured images) by using intermediate information that is obtained in the process to calculate the world coordinates of the face feature point. Explanation of the contents common to those of the first embodiment is omitted and in the following, different points are explained.

<Software Configuration>

Figure 12:
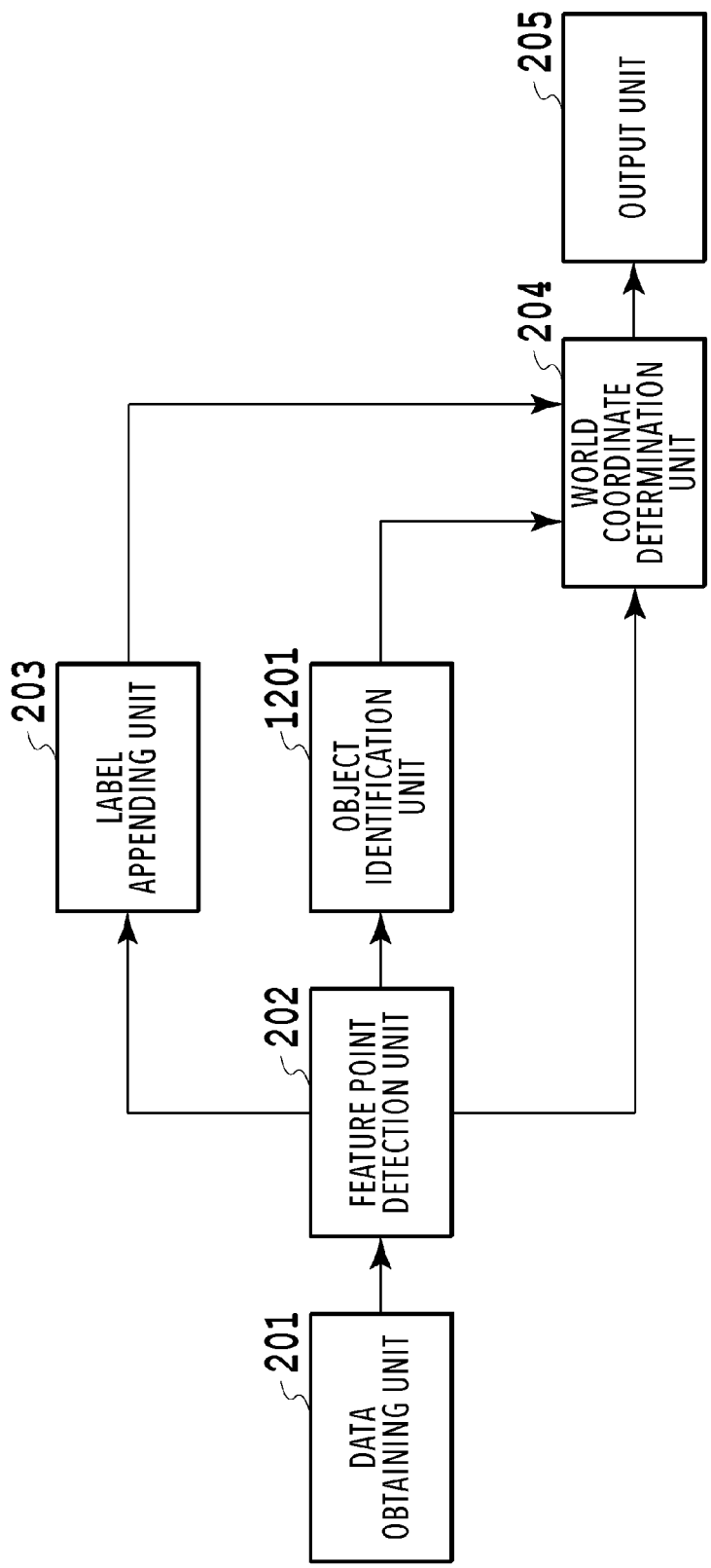
FIG. 12 is a block diagram showing a software configuration of an image processing apparatus according to a second embodiment.
Figure 13:
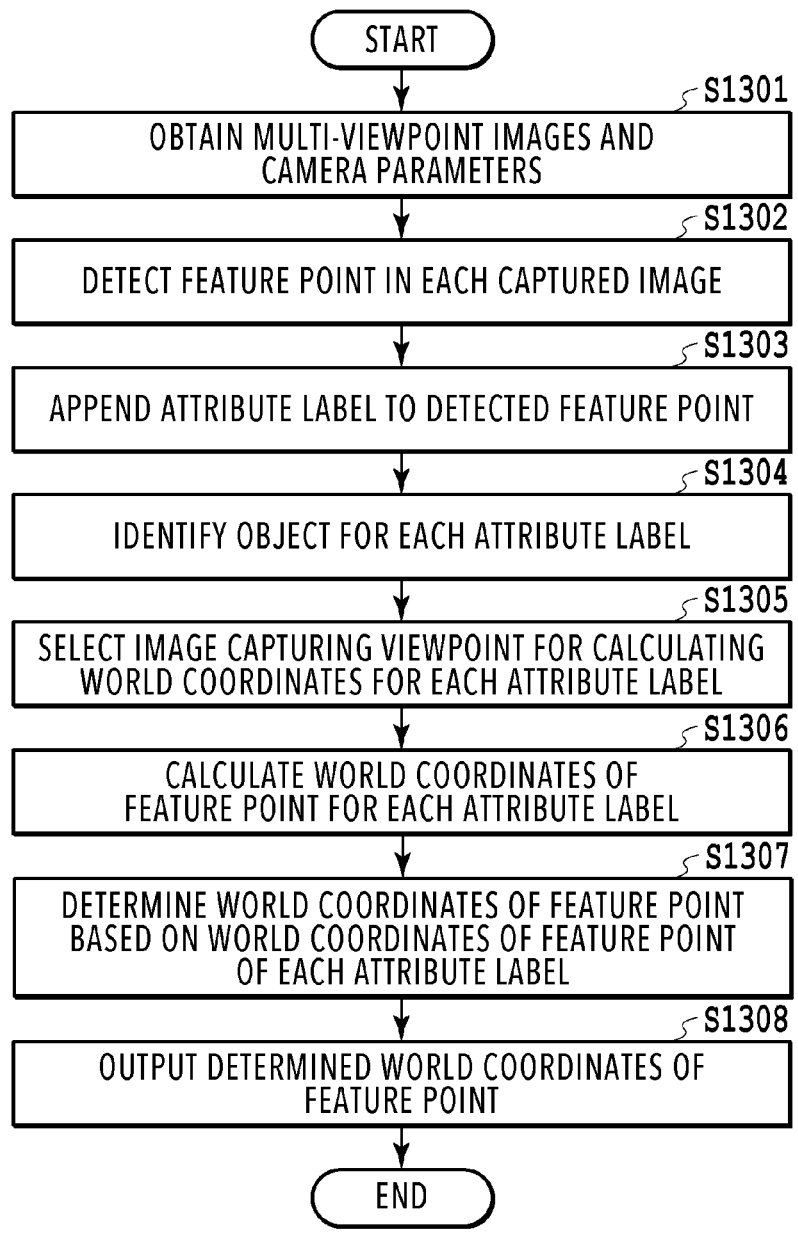
FIG. 13 is a flowchart showing a flow of processing to derive world coordinates of a feature point according to the second embodiment.

FIG. 12 is a block diagram showing the software configuration of the image processing apparatus 100 according to the present embodiment. In the following, with reference to the flowchart shown in FIG. 13, each function of the image processing apparatus 100 of the present embodiment is explained. In the following explanation, symbol "S" means a step.

Figure 3:
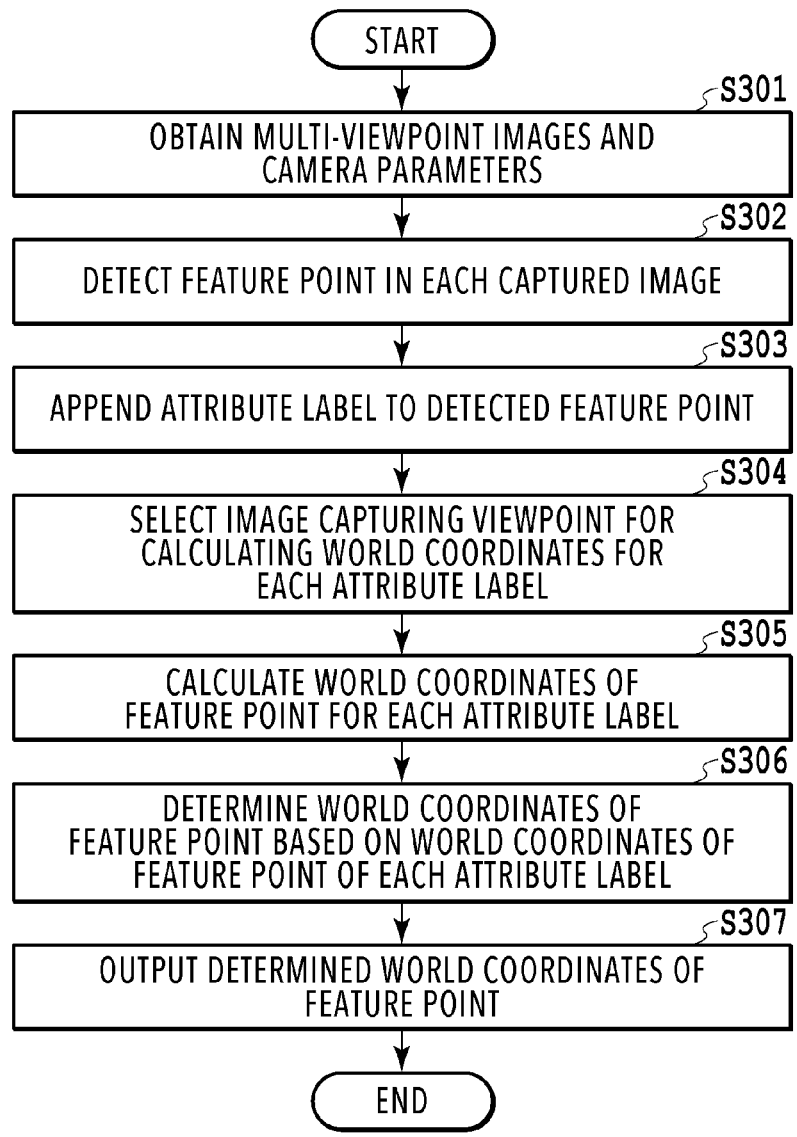
FIG. 3 is a flowchart showing a flow of processing to derive world coordinates of a feature point according to the first embodiment.

S1301 to S1303 are the same as S301 to S303 in the flow in FIG. 3 of the first embodiment, and therefore, explanation is omitted. At S1304, an identification unit 1201 performs identification between captured images for a plurality of objects captured in a plurality of captured images. From the captured images shown in FIG. 10B and FIG. 10C described previously, the face feature points of the head 1003 and the face feature points of the head 1004 are obtained, respectively. Here, for simplification of explanation, a case is explained as an example where the left and right eyes are detected as feature points. Solid-line arrows shown in FIG. 10A represent rays corresponding to both eyes of each of the face 1003 and the face 1004 in a case where they are viewed from the viewpoint 1001 and broken-line arrows represent rays corresponding to both eyes of each of the head 1003 and the head 1004 in a case where they are viewed from the viewpoint 1002. Further, a solid-line ray 1011 is a ray extending toward the right eye of the head 1003 captured from the viewpoint 1001 and a broken-line ray 1012 is a ray extending toward the right eye of the head 1003 captured from the viewpoint 1002. Furthermore, a solid-line ray 1013 is a ray extending toward the right eye of the head 1004 captured from the viewpoint 1001 and a broken-line ray 1014 is a ray extending toward the right eye of the head 1004 captured from the viewpoint 1002. Here, for each of the image capturing viewpoints, two rays extending toward the right eye exist and based on the intersections of the rays in combinations thereof, four kinds of world coordinates of the right eye are calculated as a result. However, for example, in the combination of the solid-line ray 1011 and the broken-line ray 1014, the intersection (not shown schematically) of the rays is located at a great distance behind the image capturing viewpoint. That is, the world coordinates of the right eye, which are obtained from this combination, are located behind the image capturing viewpoint, and therefore, the world coordinates cannot exist and it is easily known that the world coordinates are erroneous. Then, for the left eye, the same results are obtained. However, in a case of the left and right eyes 1103 that appear ahead of the image capturing viewpoint shown in FIG. 11A described previously, the world coordinates thereof can exist, and therefore, it is not possible to determine immediately whether the world coordinates are erroneous.

Consequently, first, the world coordinates of all the detected right eyes and left eyes are calculated. Then, for each right eye, whether the world coordinates of the left eye exist at each position that seems to be certain is checked. Here, for example, the distance between the left and right eyes of a Japanese adult female is about 10 cm. Consequently, a margin is given in light of cases of a child and a male, it is sufficient to check whether the position of the world coordinates of the left eye exists at a position 8 cm to 15 cm distant from the position of the calculated world coordinates of the right eye. Then, in a case where the left eye exists at the position that seems to be certain with respect to the right eye, it is determined that the left and right eyes according to the combination exist actually and that the world coordinates are substantially accurate world coordinates. Due to this, it is made possible to remove the face feature point that cannot exist actually. Here, for easiness of understanding, explanation is given by taking an example of the combination of the left and right eyes, but in reality, a set of feature points to which the same attribute label is appended is taken as a target and whether the distance between the feature points (for example, between nose top and right corner of mouth) is within a normal distance range is checked and the combination of feature points outside the range is removed. After that, the distance between the feature points based on the calculated three-dimensional coordinates is further checked between different attribute labels and a combination whose positional relationship between the feature points is consistent is searched for. Due to this, it is possible to identify the combination of feature points relating to the same person and identify each of a plurality of faces captured in a plurality of captured images from different viewpoints. FIG. 11B and FIG. 11C each show the group of faces identified to be the same face (person) in the captured image from each viewpoint, which is obtained by the above-described combination search, and FIG. 11B shows the group of the head 1004 and FIG. 11C shows the group of the head 1003. In the processes at S1305 and subsequent steps, it is made possible to obtain highly accurate world coordinates by performing processing for the face feature point for each group of identified persons.

As above, according to the present embodiment, also in the situation in which a plurality of objects is captured at the same time, it is possible to obtain the world coordinates of the feature point of each object with a high accuracy.

Third Embodiment

In the first and second embodiments, the case is explained where the world coordinates of the face feature point are calculated by taking, as an example, the head of a person as an object, but the image capturing-target object is not limited to the face of a person. As one example thereof, an aspect is explained as the third embodiment in which an automobile is taken as an image capturing target and the world coordinates of a feature point thereof are derived. The hardware configuration and the software configuration of the image processing apparatus are common to those of the first embodiment, and therefore, explanation thereof is omitted and in the following, different points are explained.

<Appending of Attribute Label>

Figure 14:
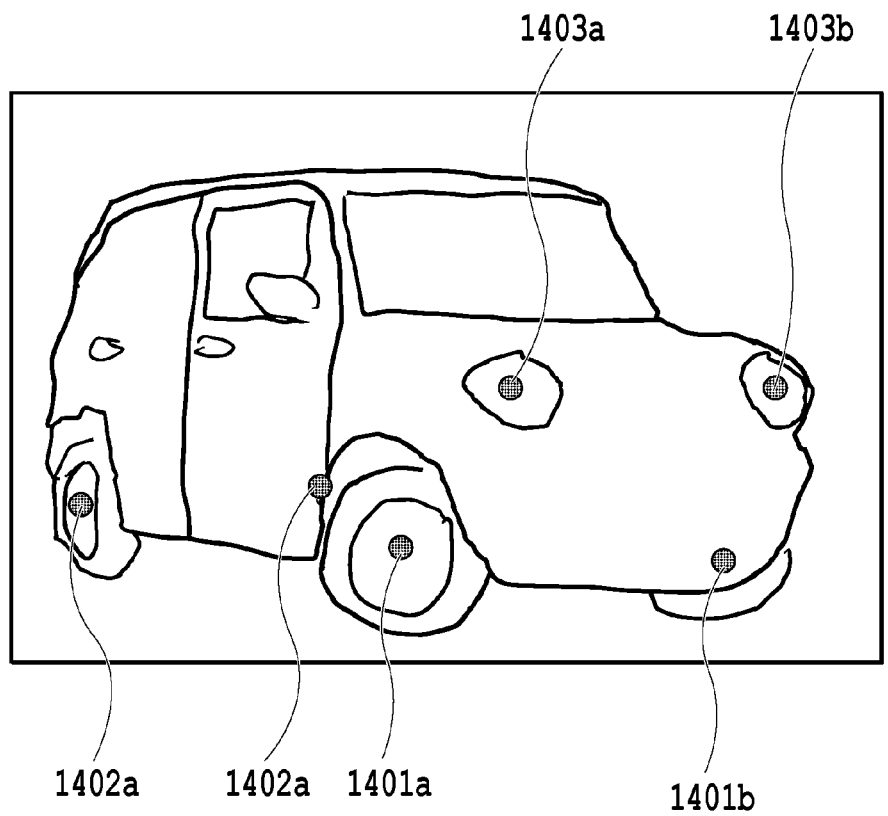
FIG. 14 is a diagram showing examples of feature points of an automobile.

In a case of the present embodiment, at the time of appending an attribute label to a detected feature point (S303), the basic model of an object is utilized. Here, the basic model is three-dimensional shape data having a rough three-dimensional structure (basic structure) of the object and position information on the feature point thereof. The feature points detected from each captured image correspond to all or part of feature points represented by the basic model. Consequently, it is possible to append the attribute label, for example, such as the left and right labels, upper and lower labels, and front and rear labels, in accordance with the normal direction of the surface of the basic model. Specifically, it is sufficient to append the attribute label for each cluster by clustering the normals. FIG. 14 illustrates six feature points (front wheels 1401a and 1401b, rear wheels 1402a and 1402b, front lights 1403a and 1403b) detected from the captured image obtained by capturing an automobile from the oblique front. Here, by utilizing feature point detection using deep learning, it is also possible to estimate the feature point of the hidden portion of the automobile based on learning. In this case, it is possible to append the right label to the two wheels 1401a and 1402a on the right side, the left label to the two wheels 1401b and 1402b on the left side, and the front label to the two front lights 1403a and 1403b. The normal direction is defined for the local coordinate system of the basic model and the direction vector is calculated in the world coordinate system common to that of the imaging apparatus by rotating the normal direction in accordance with the orientation of the automobile identified by a method, to be described later.

<Orientation Estimation>

In a case of the present embodiment, not the feature point detection unit 202 but the world coordinate determination unit 204 performs orientation estimation of the object presupposing the basic model prior to the extraction of a candidate viewpoint. The object in the present embodiment is an automobile and in general, in the automobile, the center of the wheel exists on the plane parallel to the ground surface and further, the front lights exist on the plane parallel to the plane of the front wheels. By utilizing the characteristics of the structure of the automobile such as this, the orientation of the automobile captured in the captured image is estimated. A specific procedure is as follows.

First, by the method explained in the first embodiment, the world coordinates of each feature point (here, the above-described six feature points) are calculated. Next, with reference to the world coordinates of the feature points of the four wheels among the calculated world coordinates, each of the upper-lower direction, the left-right direction, and the front-rear direction of the automobile captured in the image is determined. Specifically, the direction whose total sum of angles formed with the straight line connecting the right front wheel 1401a and the left front wheel 1401b and the straight line connecting the right rear wheel 1402a and the left rear wheel 1402b, respectively, is the smallest is taken to be the horizontal direction (left-right direction). Then, the direction whose total sum of angles formed with the straight line connecting the right front wheel 1401a and the right rear wheel 1402a and the straight line connecting the left front wheel 1401b and the left rear wheel 1402b, respectively, is the smallest is taken to be the front-rear direction. Further, by the outer product of the horizontal direction and the front-rear direction, the upper-lower direction is found. Due to this, it is possible to find the orientation of the automobile captured in the captured image. Further, it is also possible to identify the three-dimensional position in the image capturing space by calculating the average of the world coordinates of the feature points of the four wheels. By converting the orientation of the object in the world coordinate system thus obtained into that in the camera coordinate system of each viewpoint, as in the first embodiment, the candidate viewpoint extraction (S304) for each attribute label is enabled. Here, explanation is given by taking an automobile as an example, but it is needless to say that the object that is the target of the application of the present embodiment is not limited to an automobile.

As above, by the configuration of the present embodiment as well, it is made possible to obtain, with a high accuracy, the three-dimensional coordinates of the feature point of an object that can take a free orientation in the image capturing environment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to obtain, with a high accuracy, three-dimensional coordinates of a feature point of an object from a plurality of captured images whose viewpoints are different.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-011602, filed Jan. 28, 2022 which is hereby incorporated by reference wherein in its entirety.

What is claimed is:
1. An image processing apparatus comprising:
one or more memories storing instructions; and
one or more processors executing the instructions to:
  detect a feature point of an object from a plurality of images obtained by being captured from a plurality of viewpoints;
  append attribute information to the detected feature point, which indicates an area of the object to which the feature point belongs; and
  determine three-dimensional coordinates of a feature point to which the same attribute information is appended based on two-dimensional coordinates of the feature point in images corresponding to viewpoints not more than the plurality of viewpoints and not less than two,
  wherein in the determining, for each of the same attribute information, candidate viewpoints are extracted from the plurality of viewpoints and based on the two-dimensional coordinates of the feature point on the image corresponding to a viewpoint selected from among the candidate viewpoints, the three-dimensional coordinates of the feature point to which the same attribute information is appended are determined,
  in the appending, a basic model having a basic structure of the object and position information on the feature point thereof is obtained, contents of the attribute information to be appended are determined by clustering normals of the feature points identified by the position information, and the attribute information in accordance with the detected feature point is appended from the determined attribute information.

2. The image processing apparatus according to claim 1, wherein
the one or more processors further execute the instructions to estimate an orientation of the object and
in the determining, based on the estimated orientation of the object, the candidate viewpoint is extracted.

3. The image processing apparatus according to claim 1, wherein
in the appending,
the normal of the feature point identified by the position information is obtained and
one or more direction vectors are defined for a local coordinate system of the basic model and based on an angle formed by the direction vector and the normal, the attribute information corresponding to the direction vector is appended.

4. The image processing apparatus according to claim 1, wherein
in the determining,
a direction vector corresponding to the attribute information defined for a local coordinate system of the basic model is rotated in accordance with the orientation of the object and
based on a rotated direction vector, the candidate viewpoint is extracted.

5. The image processing apparatus according to claim 1, wherein
in the appending,
among the detected feature points, to the feature point belonging to the right side including the center of the object, attribute information indicating belonging to the right side area is appended and
among the detected feature points, to the feature point belonging to the left side including the center of the object, attribute information indicating belonging to the left side area is appended.

6. The image processing apparatus according to claim 1, wherein
in the appending,
among the detected feature points, to the feature point belonging to the upper side including the center of the object, attribute information indicating belonging to the upper side area is appended and
among the detected feature points, to the feature point belonging to the lower side including the center of the object, attribute information indicating belonging to the lower side area is appended.

7. The image processing apparatus according to claim 1, wherein
in the appending,
among the detected feature points, to the feature point belonging to the front side including the center of the object, attribute information indicating belonging to the front side area is appended and
among the detected feature points, to the feature point belonging to the rear side including the center of the object, attribute information indicating belonging to the rear side area is appended.

8. The image processing apparatus according to claim 1, wherein
in the determining, one of the average, the median, and the mode of the three-dimensional coordinates of the feature point to which a plurality of pieces of the attribute information is appended is determined as the three-dimensional coordinates of the feature point.

9. The image processing apparatus according to claim 1, wherein
in the determining, among the three-dimensional coordinates of the feature point to which a plurality of pieces of the attribute information is appended, the three-dimensional coordinates whose reprojection error is the smallest are determined as the three-dimensional coordinates of the feature point.

10. The image processing apparatus according to claim 1, wherein
in the determining,
in a case where a plurality of the objects is captured in the plurality of images, identification of the object is performed between different images and
for each identified object, the three-dimensional coordinates of the detected feature point are determined.

11. The image processing apparatus according to claim 10, wherein
in the determining,
a distance between feature points is found by taking a set of feature points to which the same attribute information is appended as a target and
by identifying a combination of feature points relating to a same identified object from the position relationship between the feature points based on the found distance, identification of the object is performed.

12. An image processing method comprising the steps of:
detecting a feature point of an object from a plurality of images obtained by being captured from a plurality of viewpoints;
appending attribute information to the detected feature point, which indicates an area of the object to which the feature point belongs; and
determining three-dimensional coordinates of a feature point to which the same attribute information is appended based on two-dimensional coordinates of the feature point in images corresponding to viewpoints not more than the plurality of viewpoints and not less than two,
wherein
in the determining,
for each of the same attribute information, candidate viewpoints are extracted from the plurality of viewpoints and
based on the two-dimensional coordinates of the feature point on the image corresponding to a viewpoint selected from among the candidate viewpoints, the three-dimensional coordinates of the feature point to which the same attribute information is appended are determined,
in the appending,
a basic model having a basic structure of the object and position information on the feature point thereof is obtained,
contents of the attribute information to be appended are determined by clustering normals of the feature points identified by the position information, and
the attribute information in accordance with the detected feature point is appended from the determined attribute information.

13. A non-transitory computer readable storage medium storing a program for causing a computer to perform an image processing method comprising the steps of:
detecting a feature point of an object from a plurality of images obtained by being captured from a plurality of viewpoints;
appending attribute information to the detected feature point, which indicates an area of the object to which the feature point belongs; and
determining three-dimensional coordinates of a feature point to which the same attribute information is appended based on two-dimensional coordinates of the feature point in images corresponding to viewpoints not more than the plurality of viewpoints and not less than two,
wherein
in the determining,
for each of the same attribute information, candidate viewpoints are extracted from the plurality of viewpoints and
based on the two-dimensional coordinates of the feature point on the image corresponding to a viewpoint selected from among the candidate viewpoints, the three-dimensional coordinates of the feature point to which the same attribute information is appended are determined,
in the appending,
a basic model having a basic structure of the object and position information on the feature point thereof is obtained,
contents of the attribute information to be appended are determined by clustering normals of the feature points identified by the position information, and
the attribute information in accordance with the detected feature point is appended from the determined attribute information.

* * * * *